(12) United States Patent
Fauconnet

(10) Patent No.: US 12,319,541 B2
(45) Date of Patent: Jun. 3, 2025

(54) IMAGE ANALYTICS FOR ELEVATOR MAINTENANCE

(71) Applicant: Otis Elevator Company, Farmington, CT (US)

(72) Inventor: Aurelien Fauconnet, Isdes (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 193 days.

(21) Appl. No.: 18/161,440

(22) Filed: Jan. 30, 2023

(65) Prior Publication Data

US 2023/0174343 A1 Jun. 8, 2023

Related U.S. Application Data

(63) Continuation of application No. 15/995,522, filed on Jun. 1, 2018, now Pat. No. 11,597,632.

(30) Foreign Application Priority Data

Jun. 1, 2017 (EP) ..................................... 17305643

(51) Int. Cl.
*B66B 5/00* (2006.01)
*G06T 7/00* (2017.01)

(52) U.S. Cl.
CPC .......... *B66B 5/0025* (2013.01); *B66B 5/0087* (2013.01); *G06T 7/001* (2013.01)

(58) Field of Classification Search
CPC ...... B66B 5/0025; B66B 5/0087; G06T 7/001
USPC ....................................................... 187/393
See application file for complete search history.

(56) References Cited

U.S. PATENT DOCUMENTS

| 6,612,403 B2 | 9/2003 | Silberhorn et al. |
| 6,863,161 B2 | 3/2005 | Mearns et al. |
| 8,896,216 B2 | 11/2014 | Lee |
| 9,667,929 B2 | 5/2017 | Yang |
| 9,743,490 B1 | 8/2017 | Li et al. |
| 10,176,385 B2 | 1/2019 | Brunn et al. |
| 10,504,400 B2 | 12/2019 | Wang et al. |
| 11,597,632 B2 * | 3/2023 | Fauconnet ............ B66B 5/0025 |

(Continued)

FOREIGN PATENT DOCUMENTS

| CN | 106068237 A | 11/2016 |
| CN | 106395538 A | 2/2017 |

(Continued)

OTHER PUBLICATIONS

Notice of Opposition for Application No. 17305643.3; Issued Sep. 13, 2021; 27 Pages.

(Continued)

*Primary Examiner* — Christopher Uhlir
(74) *Attorney, Agent, or Firm* — CANTOR COLBURN LLP

(57) ABSTRACT

An elevator system includes an elevator car within an elevator hoistway; a camera; and an image analysis system in communication with the camera; the camera providing a reference image to the image analysis system; the camera providing a current image to the image analysis system; the image analysis system comparing the current image to the reference image to detect a difference between the current image to the reference image; the image analysis system initiating a maintenance notification in response to the comparing.

21 Claims, 5 Drawing Sheets

(56) References Cited

U.S. PATENT DOCUMENTS

| | | |
|---|---|---|
| 2004/0094366 A1 | 5/2004 | Weinberger et al. |
| 2007/0107992 A1 | 5/2007 | Fujita |
| 2008/0024409 A1 | 1/2008 | Tomizawa et al. |
| 2008/0117020 A1 | 5/2008 | Martin |
| 2008/0198117 A1 | 8/2008 | Kumakura |
| 2008/0283342 A1 | 11/2008 | Deplazes et al. |
| 2008/0317382 A1 | 12/2008 | Franz et al. |
| 2009/0040196 A1 | 2/2009 | Duckstein et al. |
| 2011/0067958 A1 | 3/2011 | Schuster et al. |
| 2013/0140134 A1 | 6/2013 | Senger et al. |
| 2016/0034784 A1 | 2/2016 | Ohmura et al. |
| 2016/0269701 A1 | 9/2016 | Guo |
| 2017/0015521 A1 | 1/2017 | Toutaoui |
| 2017/0197807 A1 | 7/2017 | Noda et al. |
| 2018/0111787 A1 | 4/2018 | Patel |
| 2018/0158434 A1 | 6/2018 | Bian et al. |
| 2018/0238815 A1 | 8/2018 | Mupende et al. |
| 2018/0273346 A1 | 9/2018 | Hwang et al. |
| 2018/0346286 A1 | 12/2018 | Fauconnet |
| 2019/0112152 A1 | 4/2019 | Kujala et al. |
| 2019/0177122 A1 | 6/2019 | Mahoney |
| 2019/0202660 A1 | 7/2019 | Mahoney |
| 2019/0237008 A1 | 8/2019 | Ho et al. |
| 2020/0011674 A1 | 1/2020 | Fanselow et al. |
| 2020/0102188 A1 | 4/2020 | Holey et al. |
| 2020/0118259 A1 | 4/2020 | Mahadevappa et al. |
| 2020/0126497 A1 | 4/2020 | Wang |

FOREIGN PATENT DOCUMENTS

| | | |
|---|---|---|
| EP | 2687471 B1 | 9/2015 |
| JP | H1059636 A | 3/1998 |
| JP | 2001006071 A | 1/2001 |
| JP | 2001048433 A | 2/2001 |
| JP | 2008087898 A | 4/2008 |
| JP | 2010202397 A | 9/2010 |
| JP | 2012180168 A | 9/2012 |
| JP | 2013028440 A | 2/2013 |
| JP | 2013082542 A | 5/2013 |
| JP | 2015020863 A | 2/2015 |
| JP | 2015034076 A | 2/2015 |
| JP | 2015113182 A | 6/2015 |
| JP | 2015151207 A | 8/2015 |
| WO | 2010092619 A1 | 8/2010 |
| WO | 2016096697 A1 | 6/2016 |
| WO | 2016120373 A1 | 8/2016 |

OTHER PUBLICATIONS

European Search Report for application EP 17305643.3, dated Nov. 27, 2017, 8 pages.

Indian Office Action for Application No. 201814018581; Issued Mar. 3, 2021; 6 Pages.

* cited by examiner

IMAGE ANALYTICS FOR ELEVATOR MAINTENANCE

CLAIM TO PRIORITY

This application is a continuation of U.S. patent application Ser. No. 15/995,522, filed Jun. 1, 2018, which claims priority to European Patent Application No. 17305643.3, filed Jun. 1, 2017, and all the benefits accruing therefrom under 35 U.S.C. § 119, the contents of which in their entirety are herein incorporated by reference.

BACKGROUND

The subject matter disclosed herein generally relates to elevator systems and, more particularly, to the use of image analytics to facilitate elevator maintenance.

Existing elevator systems may include a camera installed at the top or bottom of the elevator car. The image from the camera may be accessed by a user (e.g., a mechanic or service person) so that the user can perform an inspection of the elevator hoistway remotely, without needing to physically enter the hoistway.

SUMMARY

According to an embodiment, an elevator system includes an elevator car within an elevator hoistway; a camera; and an image analysis system in communication with the camera; the camera providing a reference image to the image analysis system; the camera providing a current image to the image analysis system; the image analysis system comparing the current image to the reference image to detect a difference between the current image to the reference image; the image analysis system initiating a maintenance notification in response to the comparing.

In addition to one or more of the features described herein, or as an alternative, further embodiments of the elevator systems may include wherein the current image is acquired periodically.

In addition to one or more of the features described herein, or as an alternative, further embodiments of the elevator systems may include wherein the current image is acquired in response to an event.

In addition to one or more of the features described herein, or as an alternative, further embodiments of the elevator systems may include wherein the comparing the current image to the reference image generates an image comparison value.

In addition to one or more of the features described herein, or as an alternative, further embodiments of the elevator systems may include wherein the image analysis system initiates the maintenance notification in response to the image comparison value exceeding a threshold value.

In addition to one or more of the features described herein, or as an alternative, further embodiments of the elevator systems may include wherein the threshold value changes over time.

In addition to one or more of the features described herein, or as an alternative, further embodiments of the elevator systems may include wherein the image comparison value is generated in response to differences between the current image and the reference image.

In addition to one or more of the features described herein, or as an alternative, further embodiments of the elevator systems may include wherein the image comparison value is generated in response to pixel differences between the current image and the reference image.

In addition to one or more of the features described herein, or as an alternative, further embodiments of the elevator systems may include wherein the maintenance notification includes the current image.

In addition to one or more of the features described herein, or as an alternative, further embodiments of the elevator systems may include wherein the current image is highlighted with an indicator of a difference between the current image and the reference image.

In addition to one or more of the features described herein, or as an alternative, further embodiments of the elevator systems may include wherein the maintenance notification includes the reference image.

In addition to one or more of the features described herein, or as an alternative, further embodiments of the elevator systems may include wherein the camera is located at a top of the elevator hoistway, at a bottom of the elevator hoistway, on top of the elevator car, on a bottom of the elevator car or inside that elevator car.

In addition to one or more of the features described herein, or as an alternative, further embodiments of the elevator systems may include wherein the reference image is obtained after installation and test of the elevator system and prior to operation of the elevator system in a normal mode of operation.

According to another embodiment, a method for determining that maintenance is needed in an elevator system includes providing a reference image of the elevator system; providing a current image of the elevator system; comparing the current image to the reference image to detect a difference between the current image to the reference image; and initiating a maintenance notification in response to the comparing.

In addition to one or more of the features described herein, or as an alternative, further embodiments of the elevator systems may include wherein the current image is acquired periodically.

In addition to one or more of the features described herein, or as an alternative, further embodiments of the elevator systems may include wherein the current image is acquired in response to an event.

In addition to one or more of the features described herein, or as an alternative, further embodiments of the elevator systems may include wherein the comparing the current image to the reference image generates an image comparison value.

In addition to one or more of the features described herein, or as an alternative, further embodiments of the elevator systems may include wherein the maintenance notification is initiated in response to the image comparison value exceeding a threshold value.

In addition to one or more of the features described herein, or as an alternative, further embodiments of the elevator systems may include wherein the threshold value changes over time.

In addition to one or more of the features described herein, or as an alternative, further embodiments of the elevator systems may include wherein the image comparison value is generated in response to differences between the current image and the reference image.

In addition to one or more of the features described herein, or as an alternative, further embodiments of the elevator systems may include wherein the image comparison value is generated in response to pixel differences between the current image and the reference image.

In addition to one or more of the features described herein, or as an alternative, further embodiments of the elevator systems may include wherein the maintenance notification includes the current image.

In addition to one or more of the features described herein, or as an alternative, further embodiments of the elevator systems may include wherein the current image is highlighted with an indicator of a difference between the current image and the reference image.

In addition to one or more of the features described herein, or as an alternative, further embodiments of the elevator systems may include wherein the maintenance notification includes the reference image.

In addition to one or more of the features described herein, or as an alternative, further embodiments of the elevator systems may include wherein the reference image is obtained after installation and test of the elevator system and prior to operation of the elevator system in a normal mode of operation.

Technical effects of embodiments include the ability to automatically detect the need for maintenance of an elevator system using images from a camera. Current images are repeatedly compared to a reference image to determine the need for maintenance of the elevator system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
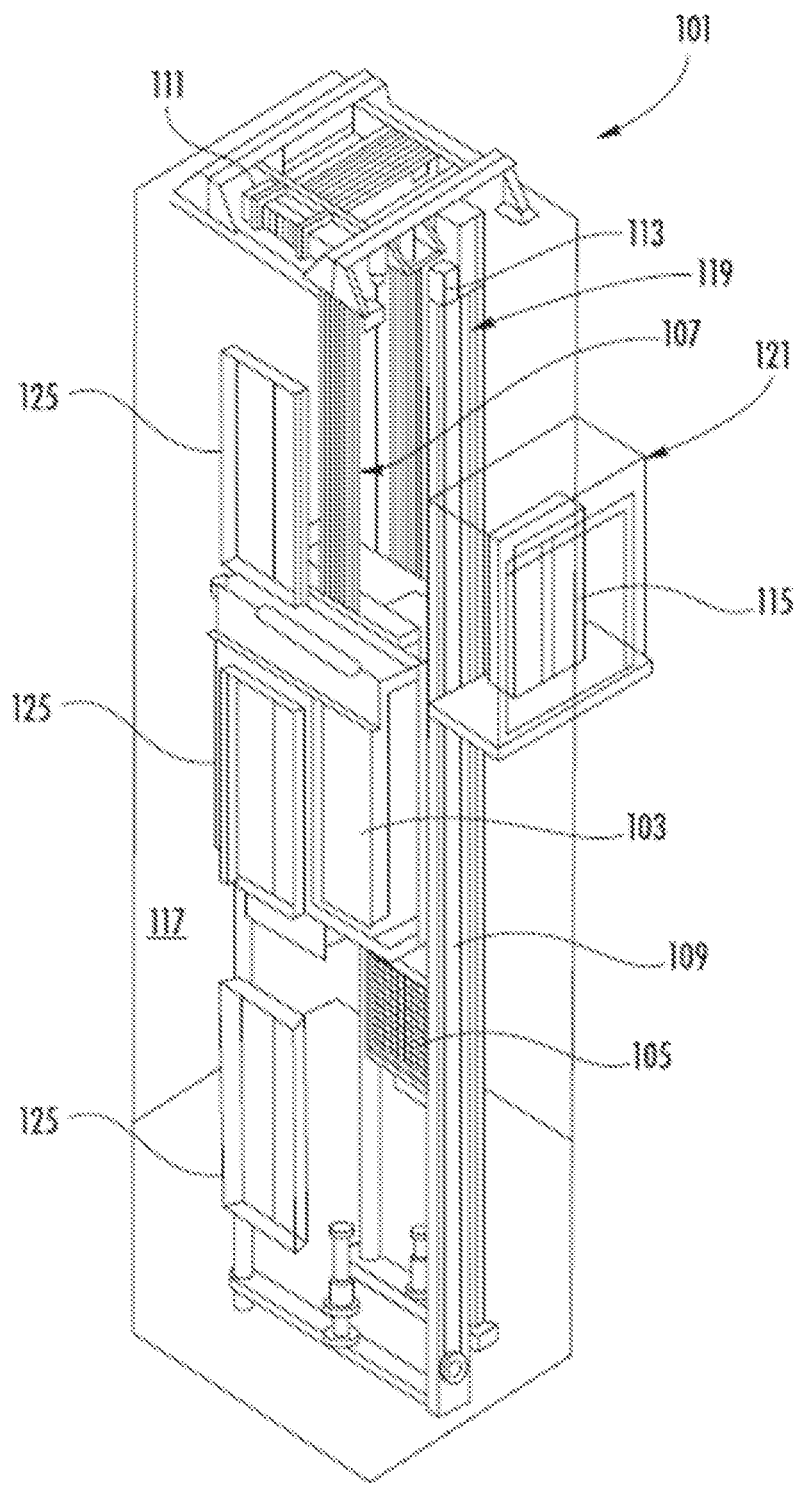
FIG. 1 is a schematic illustration of an elevator system that may employ various embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, a roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator hoistway 117. In other embodiments, the position encoder 113 may be directly mounted to a moving component of the machine 111, or may be located in other positions and/or configurations as known in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator hoistway, including ropeless, hydraulic, and multi-car elevator systems, may employ embodiments of the present disclosure. FIG. 1 is merely a non-limiting example presented for illustrative and explanatory purposes.

Figure 2:
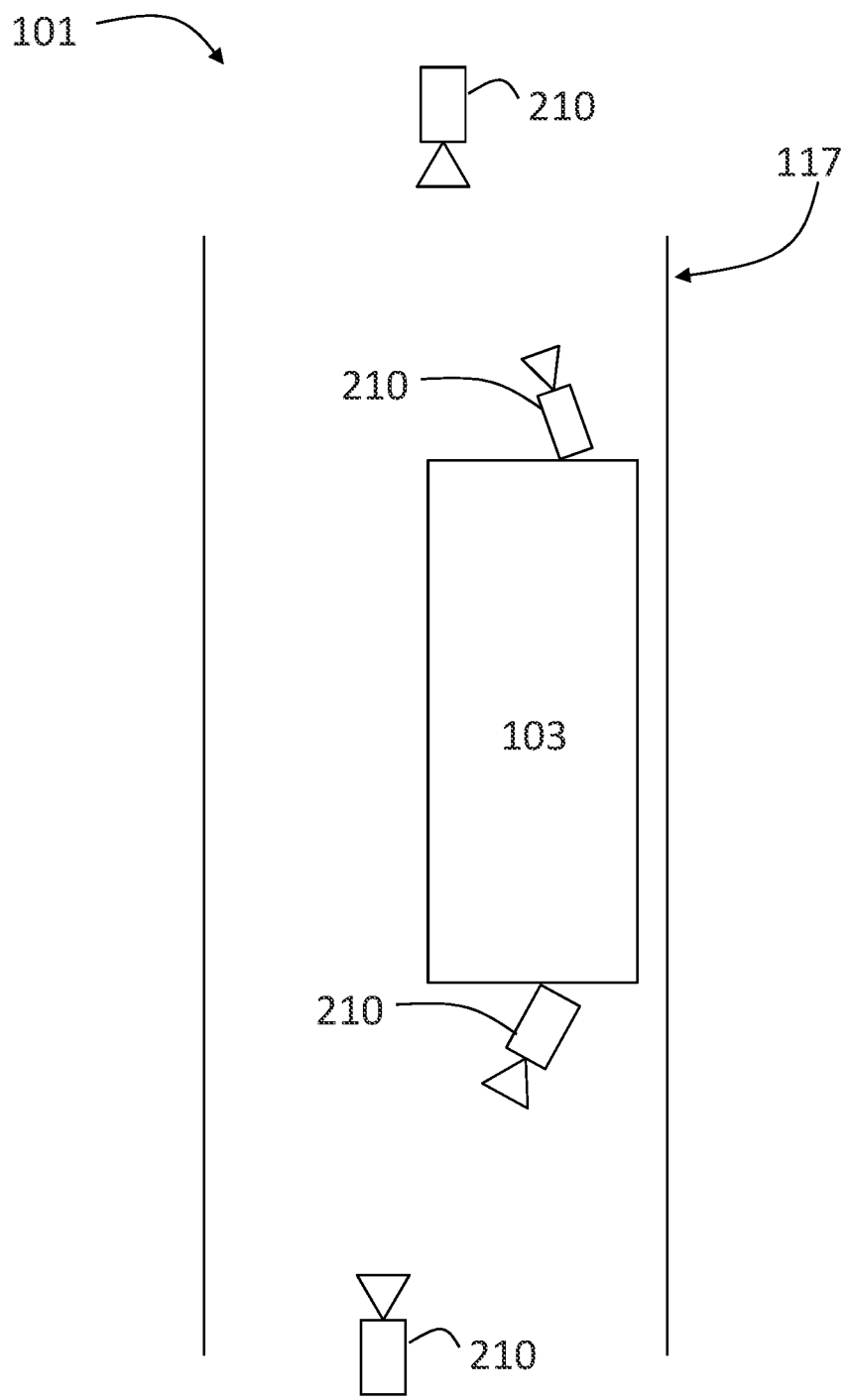
FIG. 2 depicts cameras installed in an elevator system in an example embodiment.

FIG. 2 depicts the elevator system 101 in an example embodiment. In the elevator system 101 of FIG. 2, one or more cameras 210 are mounted in the elevator system. The cameras 210 may be mounted at the top of the hoistway 117, at the bottom of the hoistway 117, on top of elevator car 103, on the bottom of elevator car 103, or any other location in the elevator system, including within the elevator car 103. As described in further detail herein, images from the one or more cameras 210 are analyzed to determine if maintenance on the elevator system is needed.

Figure 3:
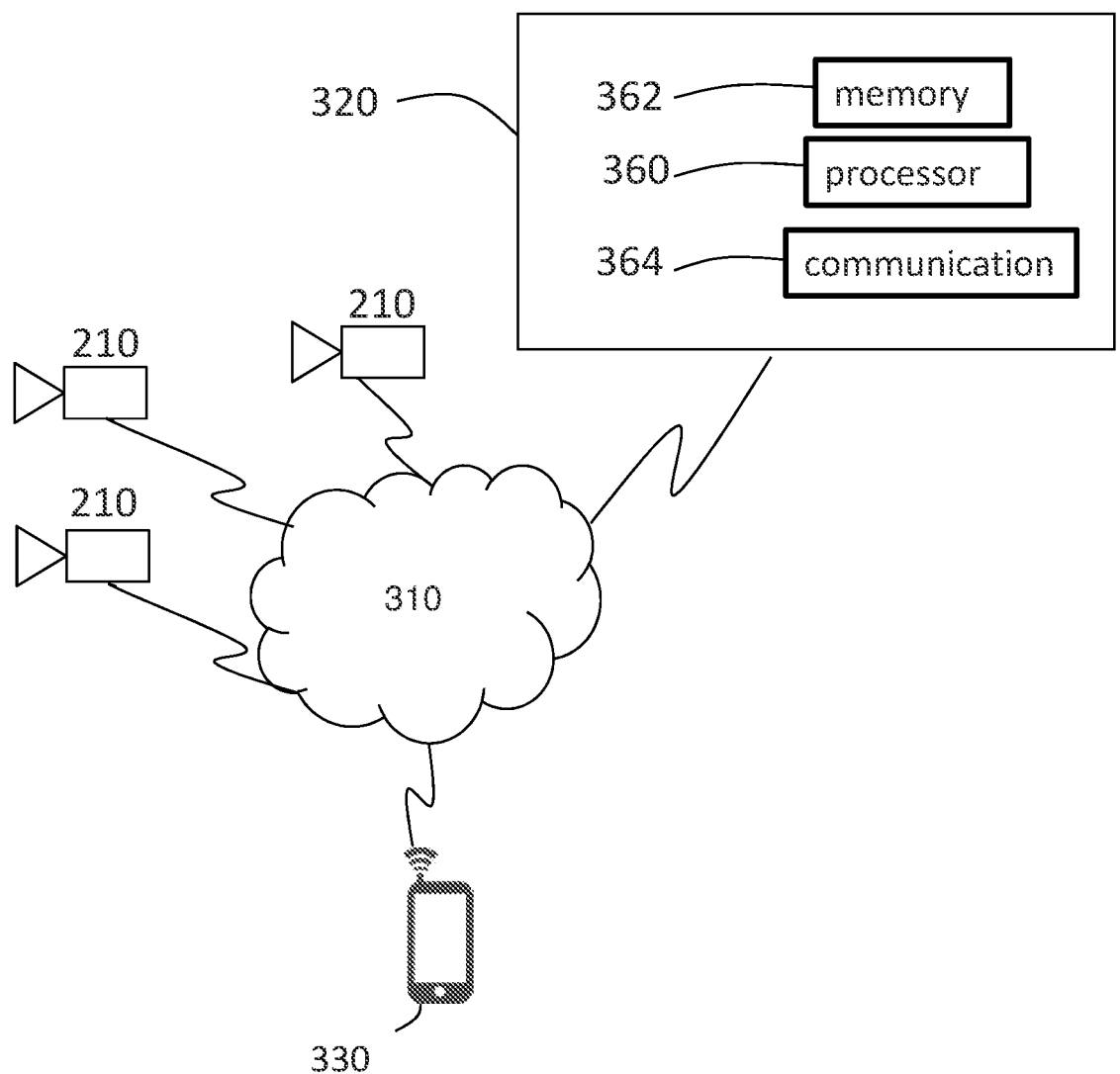
FIG. 3 depicts a system architecture in an example embodiment.

FIG. 3 depicts a system architecture in an example embodiment. The one or more cameras 210 acquire images and transmit the images to a network 310. The image from each camera 210 may comprise a single image or a sequence of images (e.g., video). The network 310 may include one or more of a wireline network; a wireless network; a local area network (LAN); and a wide area network (WAN), etc. Images from the one or more cameras 210 are provided to an image analysis system 320 via network 310. The image analysis system 320 may be implemented by the elevator controller 115. The image analysis system 320 may also be hosted on a remote computing system, such as a cloud computing platform.

The image analysis system 320 may include a processor 360, memory 362 and communication module 364 as shown in FIG. 3. The processor 360 can be any type or combination of computer processors, such as a microprocessor, microcontroller, digital signal processor, application specific integrated circuit, programmable logic device, and/or field programmable gate array. The memory 362 is an example of a non-transitory computer readable storage medium tangibly embodied in the image analysis system 320 including executable instructions stored therein, for instance, as firmware. Processor 360 executes the intrusions in memory 362 to implement the operations described herein. The communication module 364 may implement one or more communication protocols to enable receiving images over network 310 and sending notifications over the network to a user device 330.

The user device 330 may receive a maintenance notification initiated by the image analysis system 320. The mobile device 330 may include a device that is carried by a person, such as a smart phone, PDA, tablet, laptop, etc. The mobile device 330 may include wearable items, such as a smart watch, eyewear, etc. As described herein, the user device 330 may receive a maintenance notification along with one or more images selected from the camera(s) 210. The user device 330 may also be able to access camera(s) 210 to obtain a real time images from the camera(s) 210. The user device 330 may also control characteristics of the camera such as field of view (pan, tilt), zoom, focus, lighting, etc.

Figure 4:
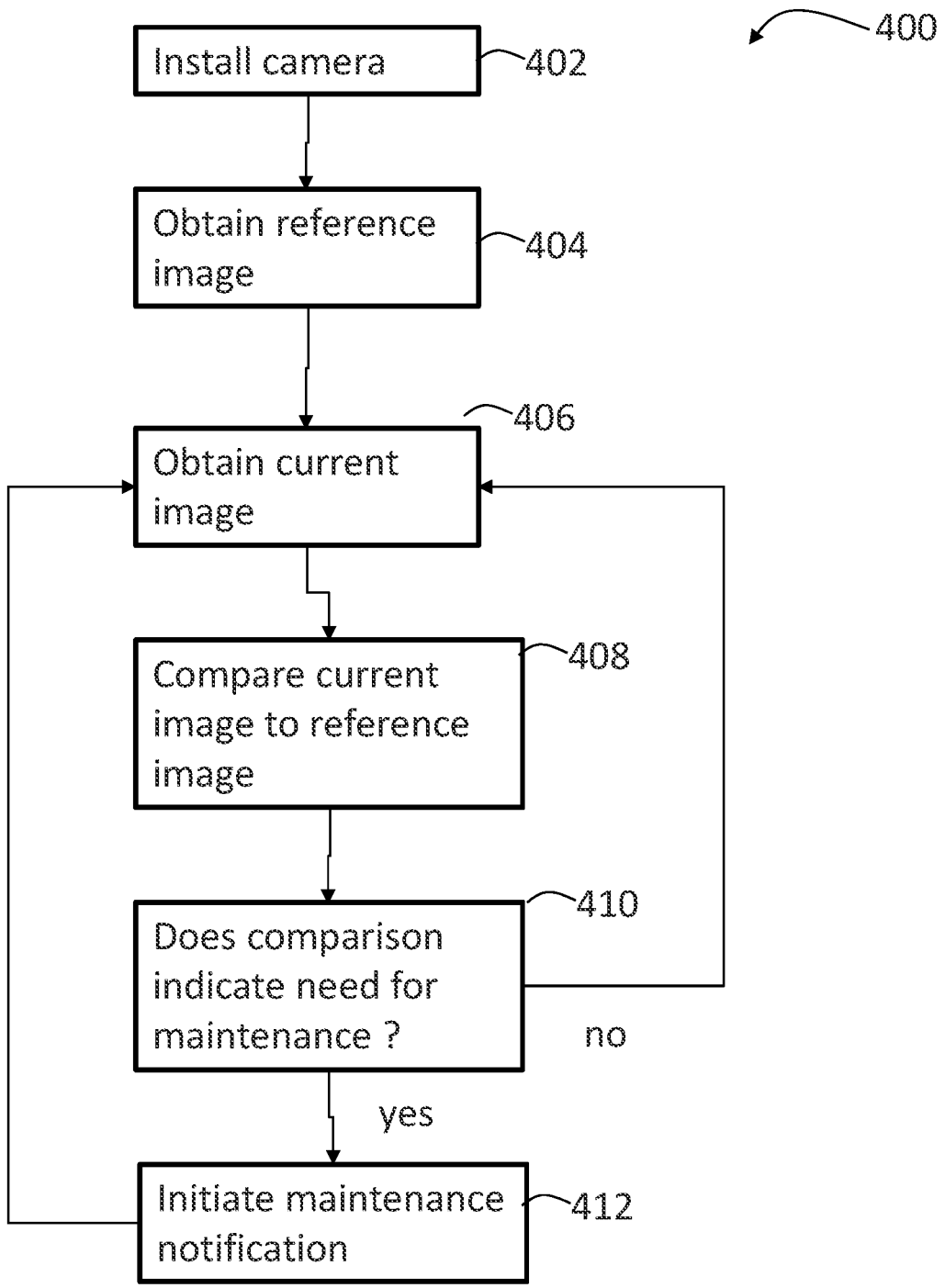
FIG. 4 depicts a method of using image analytics to determine the need for elevator maintenance in an example embodiment.

Turning now to FIG. 4, an example flow process 400 for a method of using image analytics to determine the need for elevator maintenance is shown. The process beings at 402 where at least one camera 210 is installed in the elevator system 101. The process 400 of FIG. 4 is described with reference to a single camera, but it is understood that multiple cameras may be used and the same process followed.

At 404, a reference image is obtained from the camera 210. This may occur after installation and test of the elevator system 101, but before the elevator system 101 is operated in a normal mode of operation. In one embodiment, the reference image may be obtained at any time, provided the elevator system 101 is known to be in good operating condition. For example, the reference image may be obtained while a mechanic is on site working on the elevator system 101 and has deemed that all components of the elevator system 101 are in good working order. In one embodiment, a partial reference image may be obtained. For example, a new reference image may be obtained for components known to be in good working condition while other components may continue to use the pre-existing reference image. The reference image is transmitted to the image analysis system 320 and stored in memory 362. Also, the camera and, in one embodiment, car position (based upon the information given by the car positioning system), properties associated with the reference image may be transmitted to the image analysis system 320 and stored in memory 362. The camera properties may include location (if the camera is mounted to the elevator car 101), point of view, lighting, focal length, etc.

Once the reference image is acquired, the system periodically acquires a current image at 406. The current image may be acquired on a time schedule (e.g., hourly, daily, weekly or when the elevator traffic is low). Additionally, the current image may be acquired in response to an event such as error logged in the elevator controller, a certain volume of usage of the elevator system 101, etc. The current image is transmitted to the image analysis system 320 and stored in memory 362. In one embodiment, a current image is obtained using the same camera properties as the reference image. In one embodiment, the current image and reference image may be obtained with slightly or substantially different camera properties.

At 408, the image analysis system 320 compares the current image to the reference image to derive an image comparison value. This may be performed by comparing pixel values at the same locations in the current image and the reference image, or by any other known image comparison tool. A difference in pixel value at one location in the current image and the reference image indicates a change between the current image and the reference image. The absolute values of all the pixel differences between current image and the reference image may then be summed to generate an image comparison value. The pixel comparisons may be made, for example, based on change in color, change in brightness, etc.

Figure 5:
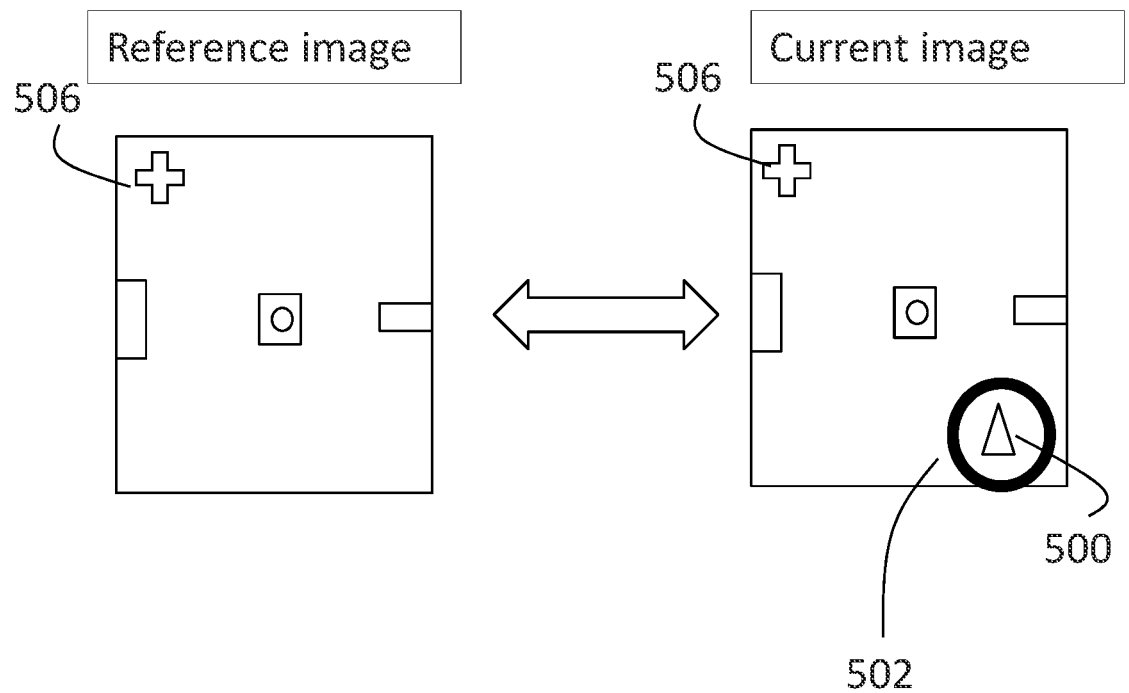
FIG. 5 depicts a comparison between a reference image and a current image in an example embodiment.

To compare the current image and the reference image, the image analysis system 320 may use one or more registration marks. The registration mark may be a physical mark (e.g., painted) positioned in the hoistway where the camera 210 is directed (e.g., on the pit floor, on the wall of the hoistway, etc.). Referring to FIG. 5, a registration mark 506 in the form of a plus sign is used to align the reference image to the current image. Using the registration mark 506, the image analysis system 320 first ensures that the registration mark 506 in the reference image is superimposed with and aligned with the registration mark 506 of the current image. Once the images are aligned, the image analysis system 320 then compares the current image to the reference image as described herein.

At 410, the image analysis system 320 determines if the image comparison value indicates a need for maintenance on the elevator system 101. The image analysis system 320 may compare the image comparison value to a threshold value to determine if there is a need for maintenance on the elevator system 101. If the image comparison value exceeds the threshold value, this indicates something is different between the current image and the reference image, which may indicate a need for maintenance. The threshold value may adjust over time, so that effects of dust, aging cameras, etc., would not result in a false positive indication of a need for maintenance on the elevator system 101. The image analysis system 320 may also determine if the differences between current image and the reference image are global or local. For example, if all pixels in the current image are 10% dimmer than those in the reference image, this suggests the difference is due to the camera, lens, dust, etc. If a localized group of pixels in the current image are 10% dimmer than those in the reference image, this suggests something has changed, such as an object has moved, debris, etc.

At 410, if the image comparison value does not indicate a need for maintenance, flow returns to 406 where the next current image is acquired. At 410, if the image comparison value does indicate a need for maintenance, the process flows to 412 where a maintenance notification is initiated. In an example embodiment, the image analysis system 320 generates and sends the maintenance notification to the user device 330. In other embodiments, the image analysis system 320 communicates with another system (e.g., an SMS or email server) to generate the maintenance notification.

The maintenance notification may include a general notice that a maintenance event has been detected and may be accompanied by the current image, the reference image or both the current image and the reference image. FIG. 5 depicts an example reference image and current image transmitted to the user device 330 as part of a maintenance notification. The difference 500 between the reference image and current image may be highlighted with an indicator 502 to aid the user in determining the cause of the maintenance notification. The user may then perform the appropriate maintenance operations on the elevator system 101.

Embodiments facilitate maintenance of an elevator system by providing a maintenance notification only when needed. This eliminates the need to a user to regularly access the images from a camera and review the images.

Those of skill in the art will appreciate that various example embodiments are shown and described herein, each having certain features in the particular embodiments, but the present disclosure is not thus limited. That is, features of the various embodiments can be exchanged, altered, or otherwise combined in different combinations without departing from the scope of the present disclosure.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., a processor, apparatus or system) to perform one or more operations as described herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. An elevator system comprising:
   an elevator car within an elevator hoistway;
   a camera;
   an image analysis system in communication with the camera;
   the camera providing a reference image to the image analysis system;
   the camera providing a current image to the image analysis system;
   the image analysis system comparing the current image to the reference image to detect a difference between the current image to the reference image;
   the image analysis system initiating a maintenance notification in response to the comparing;
   wherein the maintenance notification includes the current image;
   wherein the current image in the maintenance notification is highlighted with an indicator of a difference between the current image and the reference image.

2. The elevator system of claim 1, wherein the current image is acquired periodically.

3. The elevator system of claim 1, wherein the current image is acquired in response to an event.

4. The elevator system of claim 1, wherein the comparing the current image to the reference image generates an image comparison value.

5. The elevator system of claim 4, wherein the image analysis system initiates the maintenance notification in response to the image comparison value exceeding a threshold value.

6. The elevator system of claim 5, wherein the threshold value changes over time.

7. The elevator system of claim 4, wherein the image comparison value is generated in response to differences between the current image and the reference image.

8. The elevator system of claim 4, wherein the image comparison value is generated in response to pixel differences between the current image and the reference image.

9. The elevator system of claim 1,
   wherein the maintenance notification includes the reference image.

10. The elevator system of claim 1, wherein the camera is located at a top of the elevator hoistway, at a bottom of the elevator hoistway, on top of the elevator car, on a bottom of the elevator car or inside that elevator car.

11. The elevator system of claim 1, wherein the reference image is obtained after installation and test of the elevator system and prior to operation of the elevator system in a normal mode of operation.

12. A method for determining that maintenance is needed in an elevator system, the method comprising:
   providing a reference image of the elevator system;
   providing a current image of the elevator system;
   comparing the current image to the reference image to detect a difference between the current image to the reference image; and
   initiating a maintenance notification in response to the comparing;
   wherein the maintenance notification includes the current image;
   wherein the current image in the maintenance notification is highlighted with an indicator of a difference between the current image and the reference image.

13. The method of claim 12, wherein the current image is acquired periodically.

14. The method of claim 12, wherein the current image is acquired in response to an event.

15. The method of claim 12, wherein the comparing the current image to the reference image generates an image comparison value.

16. The method of claim 15, wherein the maintenance notification is initiated in response to the image comparison value exceeding a threshold value.

17. The method of claim 16, wherein the threshold value changes over time.

18. The method of claim 12, wherein the image comparison value is generated in response to differences between the current image and the reference image.

19. The method of claim 15, wherein the image comparison value is generated in response to pixel differences between the current image and the reference image.

20. The method of claim 12,
wherein the maintenance notification includes the reference image.

21. The method of claim 12, wherein the reference image is obtained after installation and test of the elevator system and prior to operation of the elevator system in a normal mode of operation.

* * * * *